US009204156B2

(12) United States Patent  
Lu et al.

(10) Patent No.: US 9,204,156 B2  
(45) Date of Patent: Dec. 1, 2015

(54) ADDING TEMPORAL SCALABILITY TO A NON-SCALABLE BITSTREAM

(75) Inventors: Mei-Hsuan Lu, Bellevue, WA (US); Ming-Chieh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 501 days.

(21) Appl. No.: 13/288,779

(22) Filed: Nov. 3, 2011

(65) Prior Publication Data

US 2013/0114718 A1    May 9, 2013

(51) Int. Cl.
- *H04N 19/00*   (2014.01)
- *H04N 19/40*   (2014.01)
- *H04N 19/48*   (2014.01)
- *H04N 19/31*   (2014.01)
- *H04N 19/70*   (2014.01)

(52) U.S. Cl.
CPC .............. *H04N 19/40* (2014.11); *H04N 19/31* (2014.11); *H04N 19/48* (2014.11); *H04N 19/70* (2014.11)

(58) Field of Classification Search
CPC ..... H04N 7/50; H04N 7/26244; H04N 5/145; H04N 7/26765; H04N 7/26015
USPC .................................................... 375/240.16
See application file for complete search history.

(56) References Cited

U.S. PATENT DOCUMENTS

| | | | |
|---|---|---|---|
| 2006/0013318 A1* | 1/2006 | Webb et al. | 375/240.25 |
| 2006/0233247 A1 | 10/2006 | Visharam et al. | |
| 2007/0206673 A1 | 9/2007 | Cipolli et al. | |
| 2007/0223575 A1* | 9/2007 | Wang et al. | 375/240.1 |
| 2007/0230568 A1* | 10/2007 | Eleftheriadis et al. | 375/240.1 |
| 2008/0175325 A1 | 7/2008 | Hannuksela et al. | |
| 2009/0003431 A1 | 1/2009 | Zhu et al. | |
| 2009/0116546 A1 | 5/2009 | Park et al. | |
| 2009/0219989 A1* | 9/2009 | Tanaka et al. | 375/240.01 |
| 2010/0091837 A1 | 4/2010 | Zhu et al. | |
| 2010/0208825 A1 | 8/2010 | Chou et al. | |
| 2012/0057635 A1* | 3/2012 | Rusert et al. | 375/240.16 |

OTHER PUBLICATIONS

Cock et al. Advanced Bitstream Rewriting From H.264/AVC to SVC, ICIP 2008.*
Dziri et al., "P-Picture based H.264 AVC to H.264 SVC Temporal Transcoding," *IEEE*, pp. 425-430 (2008).
Schäfer et al., "MCTF and Scalability Extension of H.264/AVC and its Application to Video Transmission, Storage, and Surveillance," *Proc. SPIE*, vol. 5960, 12 pp. (2005).
ITU-T, "Advanced Video Coding for Generic Audiovisual Services," ITU-T H.264, 676 pp. (Mar. 2010).

* cited by examiner

*Primary Examiner* — Jay Patel
*Assistant Examiner* — Frank Huang
(74) *Attorney, Agent, or Firm* — Tom Wong; Micky Minhas (57) ABSTRACT

Innovations described herein facilitate the addition of temporal scalability to non-scalable bitstreams. For example, a bitstream rewriter receives units of encoded video data for a non-scalable bitstream from components of a hardware-based encoder. The bitstream rewriter changes at least some of the units of encoded video data so as to produce a scalable bitstream with temporal scalability. In doing so, the bitstream rewriter can associate an original sequence parameter set (SPS) and original picture parameter set (PPS) with pictures for a temporal base layer, and associate a new SPS and new PPS with pictures for a temporal enhancement layer. The bitstream rewriter can also alter syntax elements in the units of encoded video data, for example, changing syntax elements in a slice header in ways that avoid bit shifting operations for following coded slice data for a unit of encoded video data for the temporal enhancement layer.

25 Claims, 9 Drawing Sheets

Figure 1 software 180 implementing one or more innovations for adding temporal scalability to a non-scalable bitstream

Figure 7

Figure 3a $I_0 \rightarrow P_1 \rightarrow P_2 \rightarrow P_3 \rightarrow P_4 \rightarrow P_5 \rightarrow P_6 \rightarrow P_7 \rightarrow P_8 \rightarrow P_9 \rightarrow P_{10} \rightarrow P_{11} \rightarrow \ldots$

| slice_header( ) { | C | Descriptor |
|---|---|---|
|   first_mb_in_slice | 2 | ue(v) |
|   slice_type | 2 | ue(v) |
|   pic_parameter_set_id | 2 | ue(v) |
|   if( separate_colour_plane_flag == 1 ) | | |
|     colour_plane_id | 2 | u(2) |
|   frame_num | 2 | u(v) |
|   if( !frame_mbs_only_flag ) { | | |
|     field_pic_flag | 2 | u(1) |
|     if( field_pic_flag ) | | |
|       bottom_field_flag | 2 | u(1) |
|   } | | |
|   if( IdrPicFlag ) | | |
|     idr_pic_id | 2 | ue(v) |
|   if( pic_order_cnt_type == 0 ) { | | |
|     pic_order_cnt_lsb | 2 | u(v) |
|     if( bottom_field_pic_order_in_frame_present_flag && !field_pic_flag ) | | |
|       delta_pic_order_cnt_bottom | 2 | se(v) |
|   } | | |
|   if( pic_order_cnt_type == 1 && !delta_pic_order_always_zero_flag ) { | | |
|     delta_pic_order_cnt[ 0 ] | 2 | se(v) |
|     if( bottom_field_pic_order_in_frame_present_flag && !field_pic_flag ) | | |
|       delta_pic_order_cnt[ 1 ] | 2 | se(v) |
|   } | | |
|   if( redundant_pic_cnt_present_flag ) | | |
|     redundant_pic_cnt | 2 | ue(v) |
|   if( slice_type == B ) | | |
|     direct_spatial_mv_pred_flag | 2 | u(1) |
|   if( slice_type == P || slice_type == SP || slice_type == B ) { | | |
|     num_ref_idx_active_override_flag | 2 | u(1) |
|     if( num_ref_idx_active_override_flag ) { | | |
|       num_ref_idx_l0_active_minus1 | 2 | ue(v) |
|       if( slice_type == B ) | | |
|         num_ref_idx_l1_active_minus1 | 2 | ue(v) |
|     } | | |
|   } | | |

| | | |
|---|---|---|
| if( nal_unit_type == 20 ) | | |
|    ref_pic_list_mvc_modification( ) /* specified in Annex H */ | 2 | |
| else | | |
|    ref_pic_list_modification( ) | 2 | |
| if( ( weighted_pred_flag && ( slice_type == P \|\| slice_type == SP ) ) \|\|<br>   ( weighted_bipred_idc == 1 && slice_type == B ) ) | | |
|    pred_weight_table( ) | 2 | |
| if( nal_ref_idc != 0 ) | | |
|    dec_ref_pic_marking( ) | 2 | |
| if( entropy_coding_mode_flag && slice_type != I && slice_type != SI ) | | |
|    cabac_init_idc | 2 | ue(v) |
| slice_qp_delta | 2 | se(v) |
| if( slice_type == SP \|\| slice_type == SI ) { | | |
|    if( slice_type == SP ) | | |
|      sp_for_switch_flag | 2 | u(1) |
|    slice_qs_delta | 2 | se(v) |
| } | | |
| if( deblocking_filter_control_present_flag ) { | | |
|    disable_deblocking_filter_idc | 2 | ue(v) |
|    if( disable_deblocking_filter_idc != 1 ) { | | |
|      slice_alpha_c0_offset_div2 | 2 | se(v) |
|      slice_beta_offset_div2 | 2 | se(v) |
|    } | | |
| } | | |
| if( num_slice_groups_minus1 > 0 &&<br>   slice_group_map_type >= 3 && slice_group_map_type <= 5) | | |
|    slice_group_change_cycle | 2 | u(v) |
| } | | |

| dec_ref_pic_marking( ) { | C | Descriptor |
|---|---|---|
|   if( IdrPicFlag ) { | | |
|     no_output_of_prior_pics_flag | 2\|5 | u(1) |
|     long_term_reference_flag | 2\|5 | u(1) |
|   } else { | | |
|     adaptive_ref_pic_marking_mode_flag | 2\|5 | u(1) |
|     if( adaptive_ref_pic_marking_mode_flag ) | | |
|       do { | | |
|         memory_management_control_operation | 2\|5 | ue(v) |
|         if( memory_management_control_operation == 1 \|\|<br>          memory_management_control_operation == 3 ) | | |
|         difference_of_pic_nums_minus1 | 2\|5 | ue(v) |
|         if(memory_management_control_operation == 2 ) | | |
|         long_term_pic_num | 2\|5 | ue(v) |
|         if( memory_management_control_operation == 3 \|\|<br>          memory_management_control_operation == 6 ) | | |
|         long_term_frame_idx | 2\|5 | ue(v) |
|         if( memory_management_control_operation == 4 ) | | |
|         max_long_term_frame_idx_plus1 | 2\|5 | ue(v) |
|       } while( memory_management_control_operation != 0 ) | | |
|     } | | |
| } | | |

ADDING TEMPORAL SCALABILITY TO A NON-SCALABLE BITSTREAM

BACKGROUND

When video is streamed over the Internet and played back through a Web browser or media player, the video is delivered in digital form. Digital video is also used when video is delivered through many broadcast services, satellite services and cable television services. Real-time videoconferencing often uses digital video, and digital video is used during video capture with most smartphones, Web cameras and other video capture devices.

Digital video can consume an extremely high amount of bits. Engineers use compression (also called source coding or source encoding) to reduce the bitrate of digital video. Compression decreases the cost of storing and transmitting video information by converting the information into a lower bitrate form. Decompression (also called decoding) reconstructs a version of the original information from the compressed form. A "codec" is an encoder/decoder system.

Over the last two decades, various video codec standards have been adopted, including the H.261, H.262 (MPEG-2 or ISO/IEC 13818-2), H.263 and H.264 (AVC or ISO/IEC 14496-10) standards and the MPEG-1 (ISO/IEC 11172-2), MPEG-4 Visual (ISO/IEC 14496-2) and SMPTE 421M standards. In particular, decoding according to the H.264 standard is widely used in game consoles and media players to play back encoded video. H.264 decoding is also widely used in set-top boxes, personal computers, smart phones and other mobile computing devices for playback of encoded video streamed over the Internet or other networks. A video codec standard typically defines options for the syntax of an encoded video bitstream, detailing parameters in the bitstream when particular features are used in encoding and decoding. In many cases, a video codec standard also provides details about the decoding operations a decoder should perform to achieve correct results in decoding.

Several factors affect quality of video information, including spatial resolution, frame rate and distortion. Spatial resolution generally refers to the number of samples in a video image. Images with higher spatial resolution tend to look crisper than other images and contain more discernible details. Frame rate is a common term for temporal resolution for video. Video with higher frame rate tends to mimic the smooth motion of natural objects better than other video, and can similarly be considered to contain more detail in the temporal dimension. During encoding, an encoder can selectively introduce distortion to reduce bitrate, usually by quantizing video information during encoding. If an encoder introduces little distortion, the encoder maintains quality at the cost of higher bitrate. An encoder can introduce more distortion to reduce bitrate, but quality typically suffers. For these factors, the tradeoff for high quality is the higher cost of storing and transmitting the information in terms of bitrate.

When encoded video is delivered over the Internet to set-top boxes, mobile computing devices or personal computers, one video source can provide encoded video to multiple receiver devices. Or, in a videoconference, one device may deliver encoded video to multiple receiver devices. Different receiver devices may have different screen sizes or computational capabilities, with some devices able to decode and play back high quality video, and other devices only able to play back lower quality video. Also, different receiver devices may use network connections having different bandwidths, with some devices able to receive higher bitrate (higher quality) encoded video, and other devices only able to receive lower bitrate (lower quality) encoded video.

In such scenarios, with simulcast encoding and delivery, video is encoded in multiple different ways to provide versions of the video at different levels of distortion, temporal quality and/or spatial resolution quality. Each version of video is represented in a bitstream that can be decoded to reconstruct that version of the video, independent of decoding other versions of the video. A video source (or given receiver device) can select an appropriate version of video for delivery to the receiver device, considering available network bandwidth, screen size, computational capabilities, or another characteristic of the receiver device.

Scalable video coding (SVC) and decoding are another way to provide different versions of video at different levels of distortion, temporal quality and/or spatial resolution quality. With SVC, an encoder splits video into a base layer and one or more enhancement layers. The base layer alone provides a reconstruction of the video at a lower quality level (e.g., lower frame rate, lower spatial resolution and/or higher distortion). One or more enhancement layers can be reconstructed and added to reconstructed base layer video to increase video quality in terms of higher frame rate, higher spatial resolution and/or lower distortion. Scalability in terms of frame rate is an example of temporal scalability.

In some respects, SVC outperforms simulcast transmission because SVC exploits redundancy between different versions of the video. Usually, for a given level of quality, the combined bitrate of the base layer and enhancement layer(s) is slightly higher than the bitrate of an independently decodable simulcast version of the video. For all of the levels of quality, however, the collective bitrate of the base layer and enhancement layers is much lower than the collective bitrate of the different simulcast versions of the video. For this reason, SVC reduces uplink bandwidth utilization when video is uploaded from an encoder site to a delivery server on a network. Even for real-time communication to a single receiver device, SVC offers advantages in terms of error resilience, bitrate adaptability and scalable transmission.

SUMMARY

In summary, innovations described herein facilitate the addition of temporal scalability to non-scalable bitstreams. The innovations can help add temporal scalability to non-scalable bitstreams in ways that are computationally simple and fast. This can be especially useful when adding temporal scalability to units of encoded video data received from components of a hardware-based encoder that is adapted to produce non-scalable bitstreams.

In general, according to some of the innovations described herein, a bitstream rewriter receives units of encoded video data for a non-scalable bitstream. The bitstream rewriter changes at least some of the units of encoded video data so as to produce a scalable bitstream with multiple layers of temporal scalability. Typically, the multiple layers of temporal scalability include a temporal base layer and at least one temporal enhancement layer.

To change units of encoded video data, the bitstream rewriter can associate a first group of parameter sets with a first set of pictures for the temporal base layer and associate a second group of parameter sets with a second set of pictures for the temporal enhancement layer. For example, the first group of parameter sets includes an original sequence parameter set (SPS) for the non-scalable bitstream and an original picture parameter set (PPS) for the non-scalable bitstream, and the second group of parameter sets includes a new SPS and new PPS.

A new parameter set can be based upon an original parameter set for the non-scalable bitstream, but have a new value of parameter set identifier syntax element. The new value can be set such that, compared to the length of an original value of parameter set identifier syntax element in the original parameter set, the new value has the same length or a length that differs by a multiple of one byte. In this case, the bitstream rewriter can adjust values of parameter set identifier syntax elements in units of encoded video data without bit shifting operations. For example, in slice headers of coded slices that are associated with the temporal enhancement layer, the bitstream rewriter can adjust values of PPS identifier syntax elements such that bit shifting of the coded slice data is avoided.

In various other ways, the bitstream rewriter can change units of encoded video data by altering one or more syntax elements in the units of encoded video data. For example, the bitstream rewriter sets a value of a syntax element in a new parameter set (e.g., new SPS) for the scalable bitstream, removes one syntax element from a header for a unit of encoded video data (e.g., from a slice header for a coded slice) that is associated with the temporal enhancement layer, and adds another syntax element to the header. When the presence of the added syntax element is contingent on the value set for the syntax element in the new parameter set, and the added syntax element offsets the removed syntax element in the headers, temporal scalability can be added in a way that avoids bit shifting operations in the unit of encoded video data.

The foregoing and other objects, features, and advantages of the invention will become more apparent from the following detailed description, which proceeds with reference to the accompanying figures.

DETAILED DESCRIPTION

Innovations described herein facilitate the addition of temporal scalability to a non-scalable bitstream. These innovations provide a computationally efficient way to convert an ordinary non-scalable bitstream into a scalable bitstream with temporal scalability.

In example implementations, a bitstream rewriter receives units of encoded video data from components of a hardware-based video encoder that is adapted to produce ordinary, non-scalable bitstreams. The bitstream rewriter adds units of encoded video data and changes certain syntax elements of the received units of encoded video data to produce a scalable bitstream with multiple layers of temporal scalability. In particular, the translation of units of encoded video data to a scalable bitstream can be accomplished with low-cost operations that avoid time-consuming bit shifting of the bulk of the encoded video data.

In some examples described herein, bitstreams follow the H.264 standard, which describes syntax and semantics of scalable bitstreams (in Annex G of the standard) and non-scalable bitstreams (in so-called AVC sections of the standard). In H.264 bitstreams, the data units are network abstraction layer (NAL) units, and syntax elements such as picture parameter set (PPS) identifiers and sequence parameter set (SPS) identifiers comport with H.264 syntax and semantics. Innovations described herein can also be implemented for encoding according to other standards or formats.

More generally, various alternatives to the examples described herein are possible. Certain techniques described with reference to flowchart diagrams can be altered by changing the ordering of stages shown in the flowcharts, by splitting, repeating or omitting certain stages, etc. Various aspects of adding temporal scalability to a non-scalable bitstream can be used in combination or separately. Different embodiments use one or more of the described innovations. Some of the techniques and tools described herein address one or more of the problems noted in the background. Typically, a given technique/tool does not solve all such problems.

I. Example Computing Systems

Figure 1:
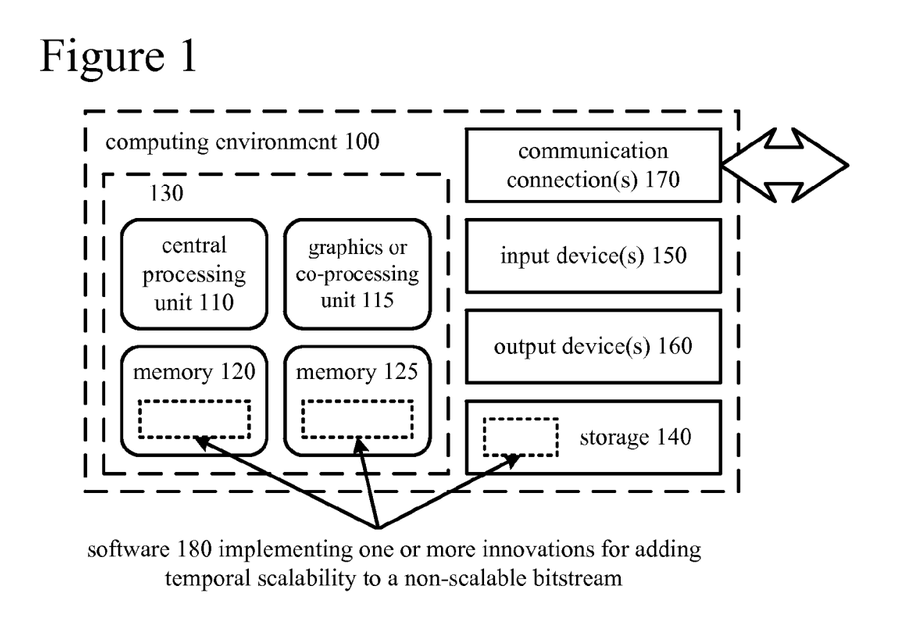
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). In FIG. 1, this most basic configuration (130) is included within a dashed line. The processing units (110, 115) execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for adding temporal scalability to a non-scalable bitstream, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information in a non-transitory way and which can be accessed within the computing system (100). The storage (140) stores instructions for the software (180) implementing one or more innovations for adding temporal scalability to a non-scalable bitstream.

The input device(s) (150) may be a touch input device such as a keyboard, mouse, pen, or trackball, a voice input device, a scanning device, or another device that provides input to the computing system (100). For video encoding, the input device(s)(150) may be a camera, video card, TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Frameworks for Adding Temporal Scalability to Non-Scalable Bitstreams

Figure 2:
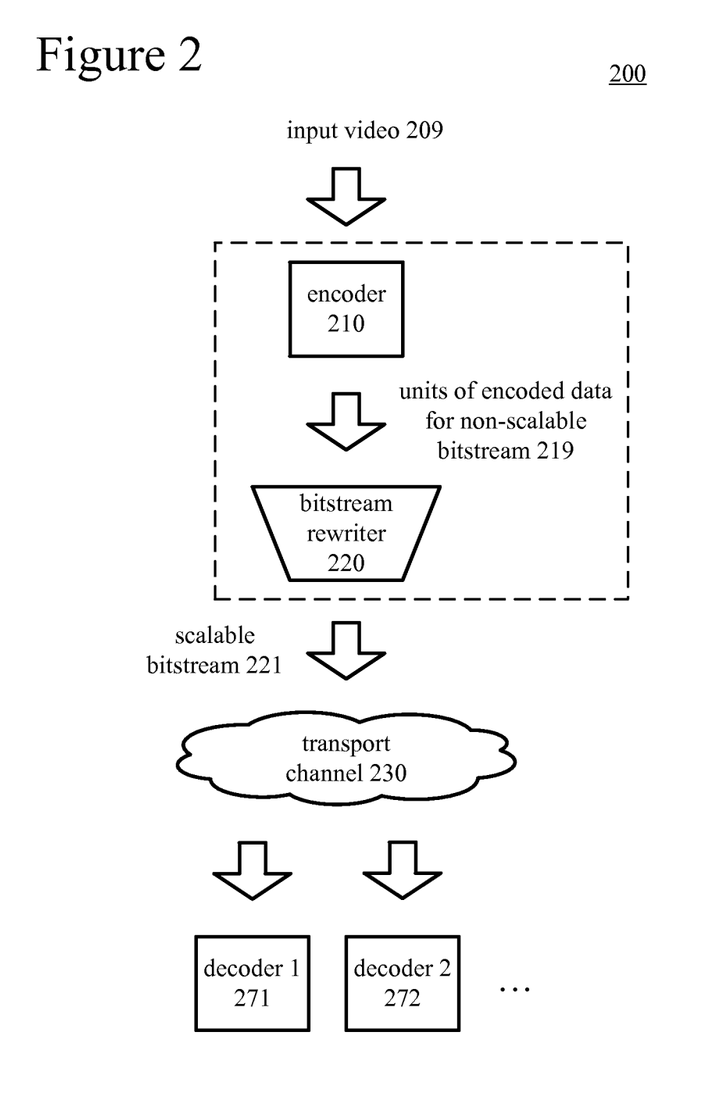
FIG. 2 is a diagram of generic framework in conjunction with which some described embodiments can be implemented.

FIG. 2 shows an example framework (200) that includes a video encoder and bitstream rewriter as well as multiple video decoders. The framework (200) supports the addition of temporal scalability to units of encoded video data for a non-scalable bitstream.

The encoder (210) encodes input video (209) to produce a non-scalable bitstream (219) of encoded data compliant with the H.264 standard (also known as ISO-IEC 14496-10), SMPTE 421M standard, H.265/HEVC standard, another standard, or a proprietary format. The encoder (210) encodes video for a videoconference, video telephone call, streaming over the Internet, or other use scenario. In example implementations, the encoder (210) is a hardware-based encoder that is specially adapted to produce only non-scalable bitstreams.

The bitstream (219) from the encoder (210) is non-scalable in that it does not include syntax elements specifically for scalable video coding and decoding. For example, the non-scalable bitstream (219) is an AVC bitstream that lacks spatial, temporal and SNR scalability, and conforms to the non-SVC portions of the H.264 standard. If certain patterns of picture coding and reference picture usage are followed in the non-scalable bitstream (219), however, the non-scalable bitstream (219) can be changed through a few modifications into a scalable bitstream with temporal scalability.

The bitstream rewriter (220) receives units of encoded video data for the bitstream (219) and modifies at least some of the units of encoded video data to form a scalable bitstream (221) with temporal scalability. The bitstream rewriter (220) can rewrite values of syntax elements, introduce new parameter sets and/or introduce new syntax elements, as further detailed in Section III.

In FIG. 2, the bitstream rewriter (220) is shown separate from the encoder (210), and the bitstream rewriter (220) does not directly regulate values given to syntax elements. The bitstream rewriter (220) and encoder (210) can be separately implemented. Or, the bitstream rewriter (220) and encoder (210) can be implemented as part of the same computing device or even as part of the same hardware component, as indicated with the dashed box in FIG. 2. For example, the encoder (210) can be a hardware-based encoder, and the bitstream rewriter (220) can be implemented as a firmware process associated with the hardware-based encoder. Even in this case, the bitstream rewriter rewrites, adds, removes, etc. syntax elements from the output of the components of the hardware-based encoder.

The scalable bitstream (221) is conveyed over a transport channel (230) using an appropriate communication protocol. The transport channel (230) can include the Internet or another computer network. A demultiplexer (not shown) can separate the scalable bitstream (221) into layers appropriate for delivery to one or more decoders (271, 272, . . . ). When the demultiplexer is in a multi-point conferencing unit, for example, the demultiplexer can select all or part of a scalable bitstream (221) that is appropriate in terms of bit rate or frame rate, considering the computational capabilities, screen size or quality setting of a given decoder, or considering the network bandwidth between the demultiplexer and the decoder. Different decoders (271, 272, . . . ) can thus receive different versions of the video from the demultiplexer. Alternatively, in a network server that delivers streaming media, the demultiplexer conveys the bitstream (or parts thereof) (221) to streaming media clients having the decoders (271, 272, . . . ), respectively, choosing an appropriate bitstream for a given streaming media client. Or, the demultiplexer can be part of a receiver associated with one of the decoders (271, 272, . . . ).

FIG. 2 shows two decoders (271, 272, . . . ). The number of decoders depends on implementation. Each decoder decodes at least part of the scalable bitstream (221) of encoded data compliant with the H.264 standard (also known as ISO-IEC 14496-10), SMPTE 421M standard, H.265/HEVC standard, another standard, or a proprietary format.

III. Adding Temporal Scalability to Non-Scalable Bitstreams

Innovations described herein facilitate the translation of a non-scalable bitstream into a scalable bitstream with temporal scalability. These innovations provide a computationally efficient way to convert an ordinary non-scalable bitstream into a scalable bitstream with temporal scalability.

Many hardware-based encoders are adapted to produce non-scalable bitstreams. For example, many hardware-based encoders are adapted to produce ordinary H.264/AVC bitstreams. To convert an ordinary, non-scalable H.264/AVC bitstream to a scalable bitstream, certain syntax elements are changed in slice headers. If a slice header for a unit of encoded video data is simply changed to satisfy the requirements for a scalable bitstream, however, the length of the slice header may change (e.g., when certain types of entropy coding are used). And, if the length of the slice header changes, the remaining coded slice data in the unit of encoded video data for the slice may need to be bit shifted. Such bit shifting operations impose a significant cost, since coded slice data constitutes the bulk of the bitstream.

In example implementations, during or after encoding with a hardware-based video encoder that is adapted to produce non-scalable H.264/AVC bitstreams, a bitstream rewriter translates units of encoded video data from the encoder into a scalable bitstream. The bitstream rewriter receives hardware-generated slice headers and hardware-generated coded slice data. The bitstream rewriter can be implemented as a firmware process used to overwrite slice headers such that they have the same length, or one or more additional bytes, so as to avoid bit shifting operations for coded slice data. Also, when the scalable bitstream has two layers of temporal scalability, memory usage is essentially the same as in ordinary encoding. In this way, AVC-only hardware components for slice header generation and slice data generation can still be used when producing a scalable bitstream with two temporal layers, without bit shifting of the coded slice data output from those AVC-only hardware components.

A. Layers of Temporal Scalability in Bitstreams

Figure 3A:
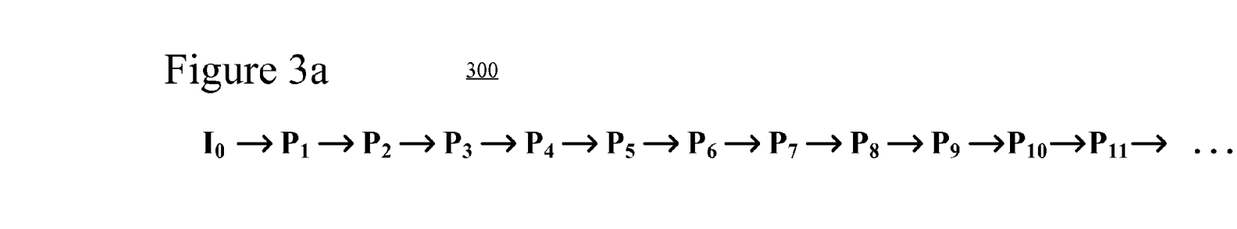
FIGS. 3a-3c are diagrams showing patterns of prediction structures in example bitstreams.
Figure 3B:
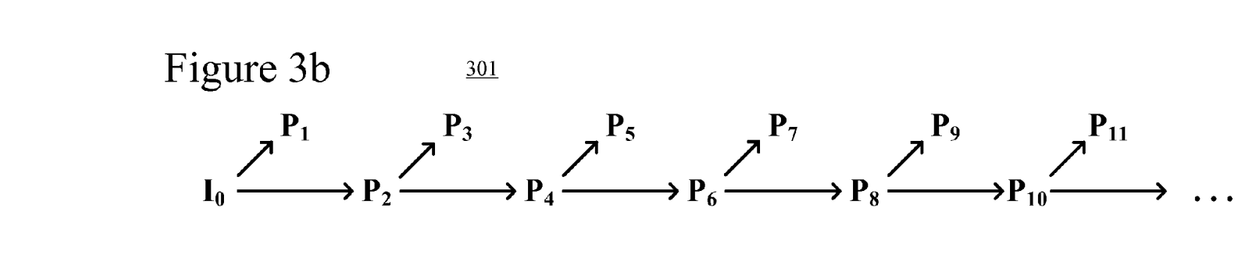
Figure 3C:
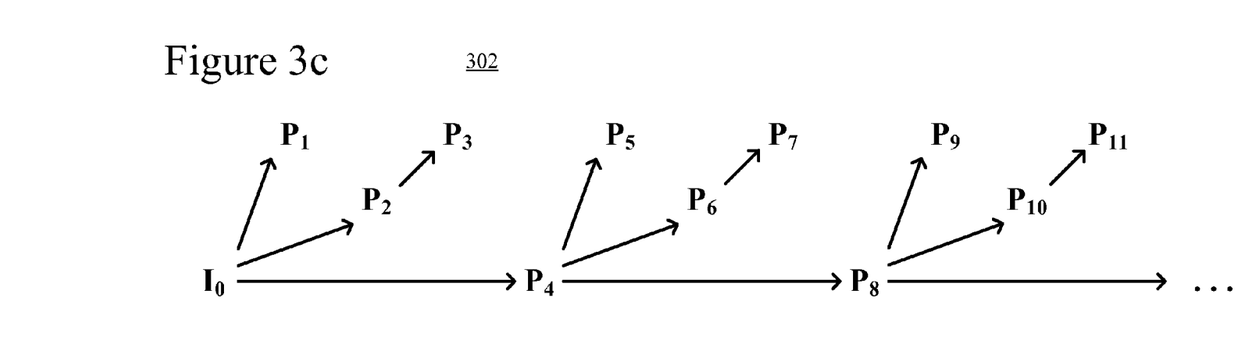

FIGS. 3a-3c illustrate example patterns of pictures in bitstreams with different layers of temporal scalability. FIGS. 3a-3c show I pictures and P pictures, where an I picture represents an intra-coded picture (or picture with only intra-coded slices for the H.264 standard), and a P picture represents a predictively-coded picture (or picture with at least some predictively-coded slices for the H.264 standard). In these figures, the subscript indicates display order for the respective pictures, which is the same as the coded order for the picture types shown.

FIG. 3a illustrates a pattern (300) for a non-scalable bitstream with a single layer of temporal scalability. In FIG. 3a, each P picture uses the immediately previous I or P picture as a reference picture. A single reference picture is buffered at any given time.

FIG. 3b illustrates a pattern (301) for a scalable bitstream with two layers of temporal scalability organized according to a hierarchical prediction structure. The temporal base layer includes the initial I picture and even-numbered P pictures. The temporal enhancement layer includes the odd-numbered P pictures. In FIG. 3b, each P picture in the temporal base layer uses the immediately previous I or P picture in the temporal base layer as a reference picture. Each P picture in the temporal enhancement layer uses the closest previous picture in the temporal base layer as a reference picture. As in FIG. 3a, a single reference picture is buffered at any given time.

FIG. 3c illustrates a pattern (302) for a scalable bitstream with three layers of temporal scalability organized according to a hierarchical prediction structure. The temporal base layer includes the initial I picture and half of the even-numbered P pictures. A first temporal enhancement layer includes the remaining even-numbered P pictures, and a second temporal enhancement layer includes the odd-numbered P pictures. The reference pictures for the temporal base layer and first temporal enhancement layer are assigned as in FIG. 3b. Each P picture in the second temporal enhancement layer uses the closest previous picture in the temporal base layer or first temporal enhancement layer as a reference picture. Two reference pictures may be buffered at any given time.

In terms of patterns of picture types and reference picture usage, changing the non-scalable bitstream of FIG. 3a to have multiple layers of temporal scalability involves two changes. First, the prediction structure is changed from a flat structure to a hierarchical prediction structure, which involves changes to reference picture relationships for at least some of the P pictures. Second, the number of reference pictures buffered for motion compensation may be increased (requiring additional memory), when the number of temporal enhancement layers is greater than one.

B. Example Techniques for Adding Temporal Scalability to AVC Bitstream

Figure 4:
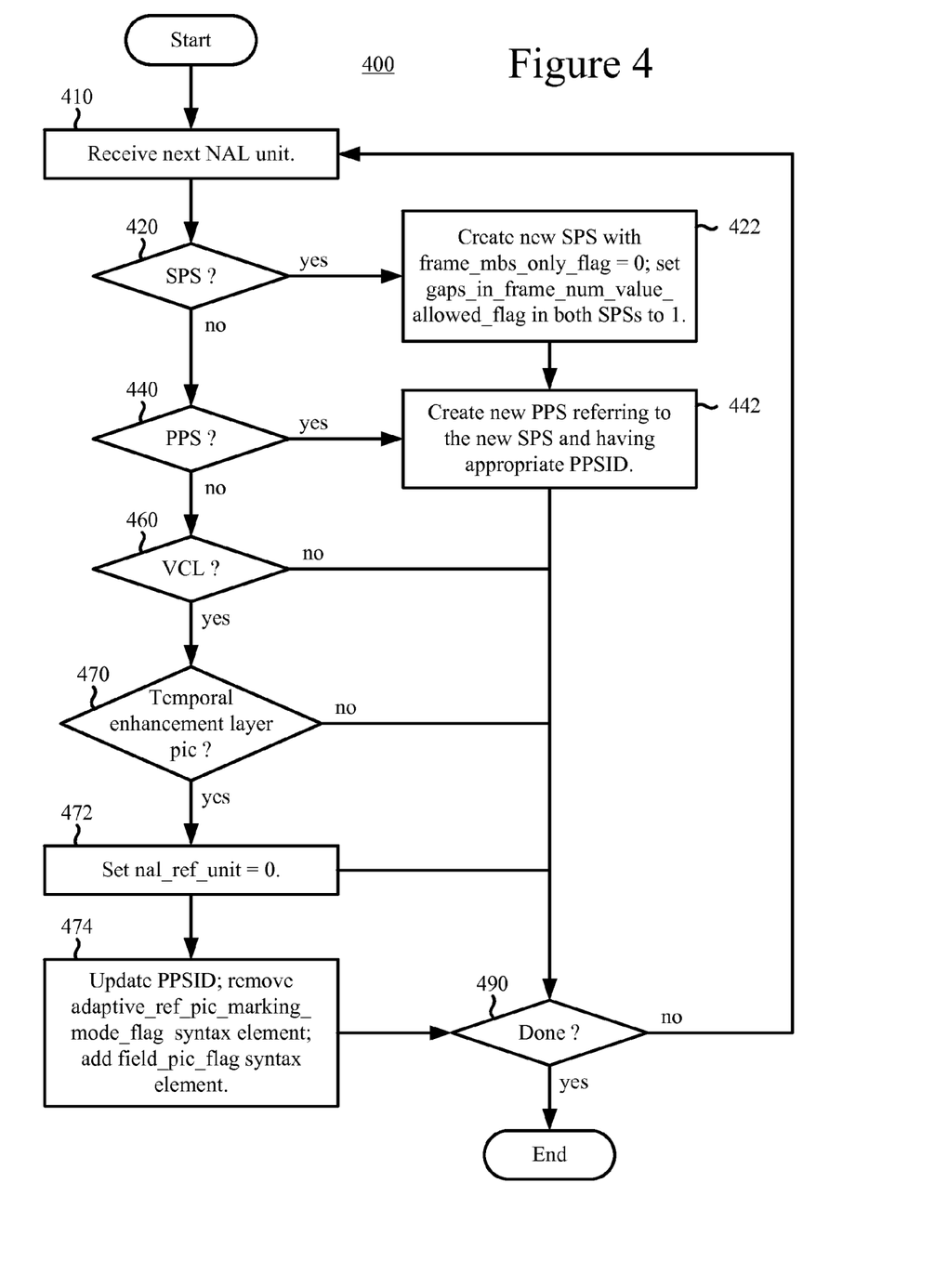
FIG. 4 is a flowchart illustrating an example technique for adding temporal scalability to an H.264/AVC bitstream.

In example implementations, a bitstream rewriter translates a non-scalable H.264/AVC bitstream into a scalable bitstream with two temporal layers. This approach allows a hardware-based AVC-only encoder to produce scalable bitstreams with two temporal layers, and the bitstream rewriting can in some cases be implemented with firmware upgrade to the hardware-based AVC-only encoder. Generally, the translation process involves changes to various syntax elements in the units of encoded video data for the non-scalable bitstream. FIG. 4 shows an example technique (400) for adding temporal scalability to an H.264/AVC bitstream. A bitstream rewriting tool such as the bitstream rewriter (220) in FIG. 2, or another type of bitstream rewriting tool, performs the technique (400).

To start, the bitstream rewriting tool receives (410) the next NAL unit for the non-scalable H.264/AVC bitstream. The bitstream rewriting tool then evaluates the NAL unit type of the NAL unit and, if appropriate, changes the NAL unit and/or adds NAL units.

The bitstream rewriting tool checks (420) if the received NAL unit is for a SPS. If so, bitstream rewriting tool performs (422) several actions for a new SPS and the original SPS from the received NAL unit. The tool creates a new SPS that will be used concurrently with the original SPS. The original SPS from the received NAL unit will be associated with coded slices for the temporal base layer, and the new SPS will be associated with coded slices for the temporal enhancement layer.

The new SPS is based on the original SPS, but has a different value of SPS identifier (SPSID) syntax element and may be changed in one other respect. In the new SPS, the bitstream rewriting tool sets the value of the frame_mbs_only_flag syntax element to 0. This can change which syntax elements are present in slice headers for the temporal enhancement layer. If the value of the frame_mbs_only_flag syntax element is set to 0 in the SPS associated with coded slices for the temporal enhancement layer, an extra bit (field_pic_flag) is signaled per slice header of a coded slice. In this way, the length of the slice header can be increased by one bit to compensate for the removal of another syntax element from the slice header of a coded slice for the temporal enhancement layer, as explained below.

Also, in both the original SPS and new SPS, the bitstream rewriting tool sets the value of the gaps_in_frame_num_value_allowed_flag syntax element to 1, because the temporal base layer and temporal enhancement layer will each have gaps in frame number values.

After creating the new SPS, or after the bitstream rewriting tool checks (440) and determines that a received NAL unit is for a PPS, the bitstream rewriting tool performs (442) several actions for a new PPS. The tool creates a new PPS that refers to the new SPS for coded slices of the temporal enhancement layer. The new PPS includes a SPSID syntax element whose value indicates the new SPS associated with the temporal enhancement layer. A PPS also includes a PPS identifier (PPSID) syntax element whose value is used in slice headers and other NAL units to reference the PPS. The new PPS is based on an original PPS for the non-scalable bitstream, but has a different value of PPSID that is appropriate for the new PPS. Thus, for a coded slice for the temporal enhancement layer, a slice header includes the PPSID value of the new PPS, and the new PPS in turn references the new SPS for the temporal enhancement layer.

In the H.264 standard, a PPSID (that is, picture_parameter_set_id) is coded with a variable length Exp-Golomb code. For a VCL NAL unit, the syntax element PPSID is part of a slice header and is coded using Exp-Golomb coding as shown in the following table.

TABLE 1

Bit Strings and Coded Numbers for Exp-Golomb Coding

| Bitstream Form | Range of Coded Numbers |
| --- | --- |
| 1 | 0 |
| 0 1 $x_0$ | 1 … 2 |
| 0 0 1 $x_1$ $x_0$ | 3 … 6 |
| 0 0 0 1 $x_2$ $x_1$ $x_0$ | 7 … 14 |
| 0 0 0 0 1 $x_3$ $x_2$ $x_1$ $x_0$ | 15 … 30 |
| 0 0 0 0 0 1 $x_4$ $x_3$ $x_2$ $x_1$ $x_0$ | 31 … 62 |
| … | … |

In Table 1, the bit string "1" represents the value 0. The bit string "0 1 $x_0$" can represent the value 1 or 2, depending on the value of the bit $x_0$ after the prefix "0 1." The bit string "0 0 1 $x_1$ $x_0$" can represent the value 3, 4, 5 or 6 depending on the values of the two bits $x_1$ $x_0$ after the prefix "0 0 1." For any bit string in Table 1, there are other bit strings whose lengths differ by a multiple of 8 bits, or one byte. For example, the bit string "0 1 $x_0$" has three bits, and the bit string "0 0 0 0 0 1 $x_4$ $x_3$ $x_2$ $x_1$ $x_0$" has eleven bits.

Slice data can be entropy coded using context-adaptive variable length coding (CAVLC) or context-adaptive binary arithmetic coding (CABAC). When slice data is encoded using CAVLC, a change to a PPSID value may cause a change to the length of the slice header, which may in turn require bit shifting of slice data for the slice to make room for the new PPSID value. This is problematic because bit shifting operations have a high cost, especially when performed repetitively for slice data, which usually constitutes most of an H.264/AVC bitstream.

Therefore, the bitstream rewriting tool adjusts the value of PPSID in a way that avoids bit shifting operations. For a value of PPSID coded with i bits, the tool assigns a new value from the set of candidate PPSID values for i bits such that the values of PPSID in the scalable bitstream satisfy the rules for uniqueness of PPSID values. The tool skips any value in the candidate PPSID value set that has already been assigned in the rewriting. For example, for a value of PPSID with 7 bits, the tool assigns a value from 7 to 14. In this case, the length of the slice header is unchanged. If the set of candidate PPSID values for i bits is too small (all values already assigned), the tool extends the set of candidate values to include values with i+8 bits, then i+16 bits, and so forth. For example, if the 7-bit candidate values from 7 to 14 have already been assigned, the tool extends the set of candidate values to include 15-bit values 127 to 254.

Figure 5:
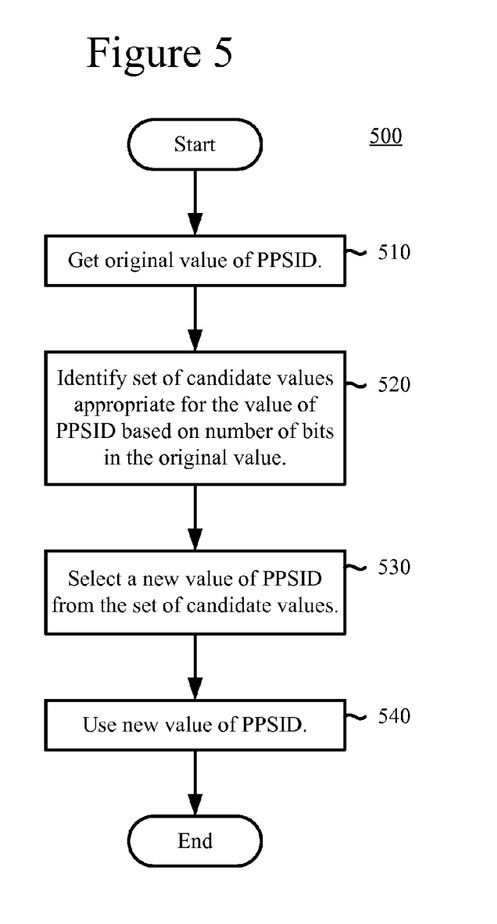
FIG. 5 is a flowchart illustrating an example technique for assigning a value of PPS identifier in a new PPS.

FIG. 5 shows an example technique (500) for assigning a value of PPSID in the new PPS. A bitstream rewriting tool such as the bitstream rewriter (220) in FIG. 2, or another type of bitstream rewriting tool, performs the technique (500).

The bitstream rewriting tool gets (510) the original value of PPSID from the original PPS and identifies (520) a set of candidate values appropriate for the new value of PPSID based on number of bits in the original value. For example, if the original PPSID value has 5 bits, the set of candidate values includes candidate PPS ID values with 5 bits. The candidate PPSID value set can also include candidate values with 13 bits, 21 bits, and so on.

The bitstream rewriting tool selects (530) a new value from the set of candidate values, skipping any value that has already been assigned, and uses (540) the new value in place of the original value of PPSID. In this way, when the original PPSID value is replaced with the new PPSID value, the original value is simply overwritten if the new value has the same number of bits as the original value. Otherwise (if the new PPSID value has a different number of bits than the original PPSID value), the data is byte shifted by an appropriate number of bytes to make room for the new PPSID value, and the new PPSID value is written in the bitstream. In this way, bit shifting operations are avoided. The rewriting may use byte shift operations, but byte shift operations are simpler to implement.

The creation of a new SPS, creation of a new PPS, and changes to the SPS and PPS happen rarely, since these types of NAL units are relatively uncommon. For that reason, the efficiency of these addition and change operations is not much of a concern. So, for these types of NAL units (unlike slice headers and coded slice data) the cost of bit shifting operations may be acceptable.

Returning to FIG. 4, if the received NAL unit for the non-scalable bitstream is not for a SPS or PPS, the bitstream rewriting tool checks (460, 470) if the received NAL unit is a VCL NAL unit for a temporal enhancement layer picture. In the example of FIG. 3b, odd-numbered pictures are associated with the temporal enhancement layer. In FIG. 4, the bitstream rewriting tool checks if the received NAL unit is a VCL NAL unit for a coded slice associated with the temporal enhancement layer.

If the received NAL unit is a VCL NAL unit for a coded slice associated with the temporal enhancement layer, in the header of the VCL NAL unit, the value of the nal_ref_idc syntax element is set (472) to zero, indicating the coded slice is not part of a picture that will be used as a reference picture. The nal_ref_idc syntax element is a fixed length field having a length of two bits, so this change does not change the length of the VCL NAL unit.

Figure 6A:
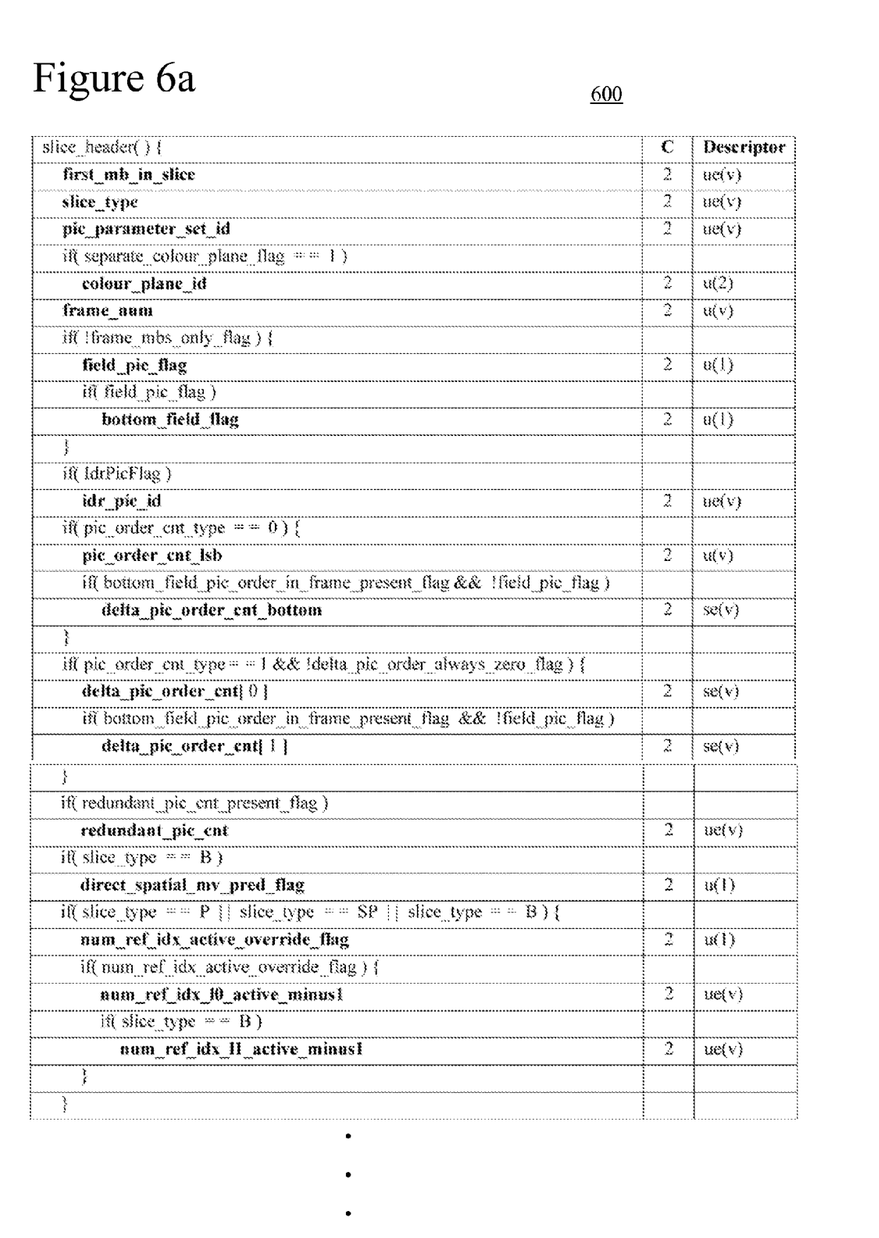
FIGS. 6a-6c are tables showing syntax elements in a slice header according to the H.264 standard.
Figure 6B:
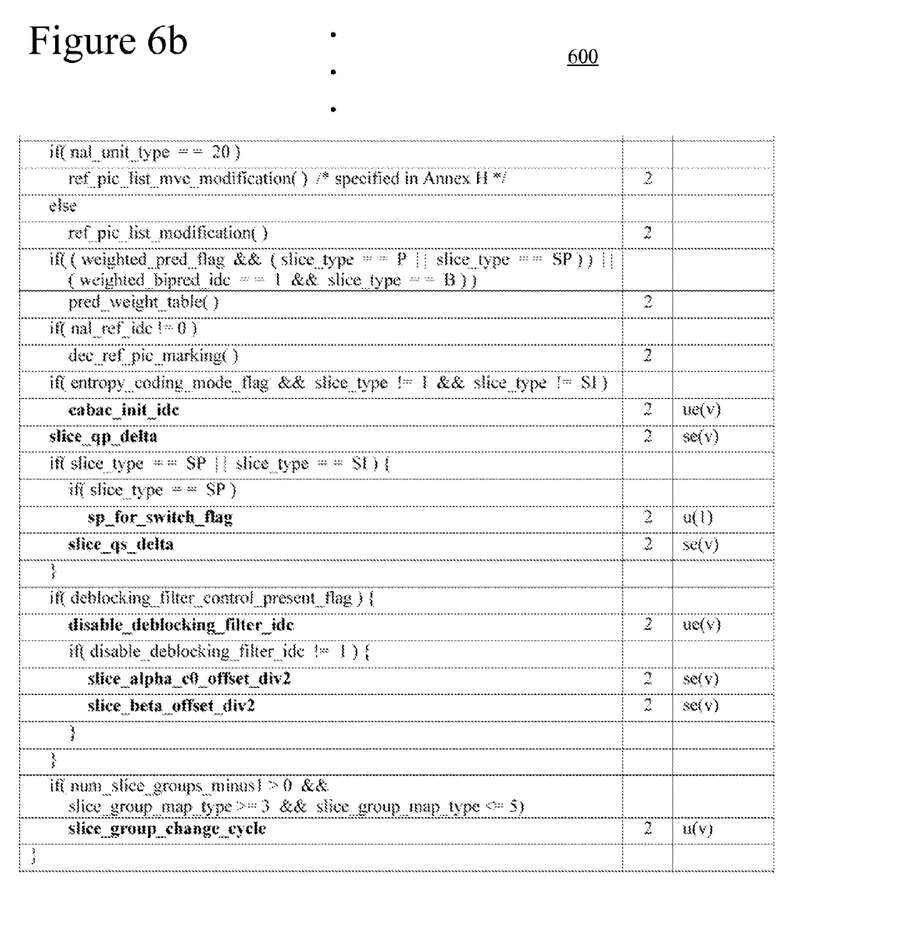
Figure 6C:
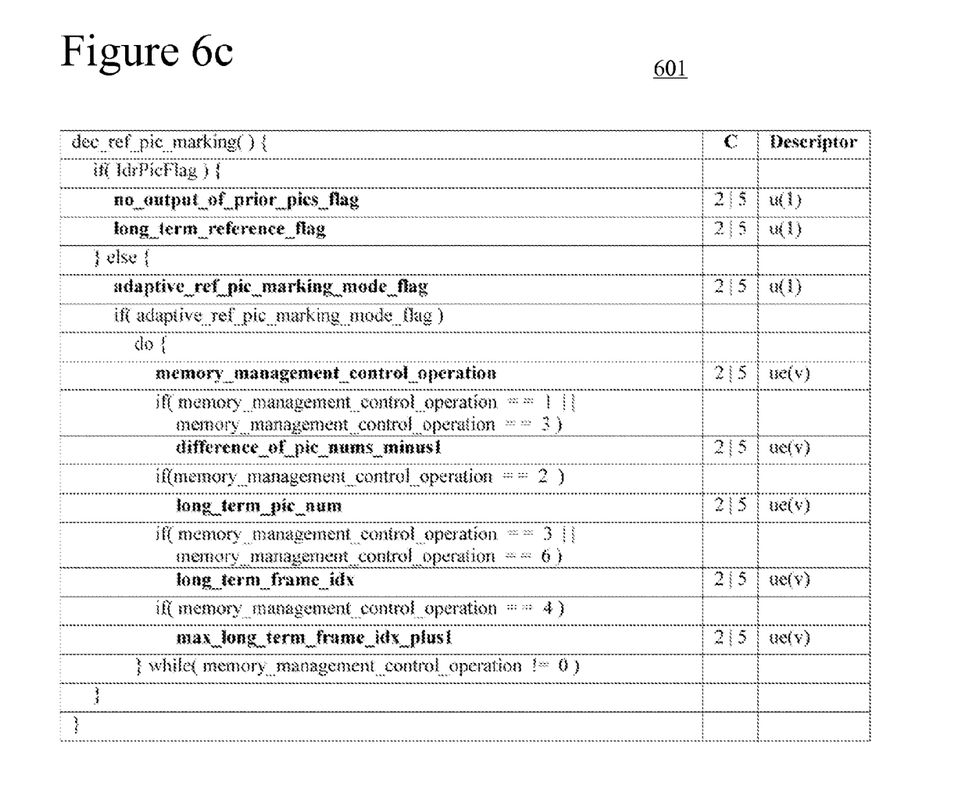

In the slice header for a coded slice associated with the temporal enhancement layer, the bitstream rewriting tool also performs (474) several actions for the slice header. Specifically, the tool updates the value of PPSID in the slice header to reference the new PPS, removes the adaptive_ref_pic_marking_mode_flag from the slice header, and adds a field_ pic_flag syntax element. FIGS. 6a and 6b show syntax elements of a slice header (600) according to the H.264 standard, including a pic_parameter_set_id syntax element and field_pic_flag syntax element. When the value of nal_ref_idc is not equal to 0, the slice header includes a def_ref_pic_marking( ) structure (601), whose details are shown in FIG. 6c. In some cases, the def_ref_pic_marking( ) structure (601) includes only a single-bit value of 0 for the adaptive_ref_pic_marking_mode_flag syntax element.

In the slice header for a coded slice associated with the temporal enhancement layer, the PPSID syntax element is replaced with the new value of PPSID for the new PPS. The new value of PPSID has the same length as the original value of PPSID, or differs in length by a multiple of one bit, so the byte alignment of the slice header is unchanged. In this way, the change in PPSID value avoids bit shifting even when CAVLC is used for slice data.

On the other hand, when the value of nal_ref_idc is changed to zero in a VCL NAL unit header, the slice header (600) in turn no longer includes a def_ref_pic_marking( ) structure (601), which removes the single-bit value of the adaptive_ref_pic_marking_mode_flag syntax element from the slice header. This makes the slice header one bit shorter. This change is not an issue when CABAC is used for slice data, since the unit is byte aligned by adding alignment bits. When CAVLC is used, however, a change in slice header size calls for bit-wise shifting that ripples through the coded slice data in order to compensate the missing bit, which is a significant due to the frequency of coded slice data.

The addition of the field_pic_flag syntax element offsets the removal of the adaptive_ref_pic_marking_mode_flag syntax element from the slice header. The field_pic_flag syntax element is present when the frame_mbs_only_flag syntax element has a value of 0, which is the case in the new SPS created for the temporal enhancement layer. The field_pic_flag syntax element can be assigned a value of 0, indicating the video for the coded slice is progressive video. In comparison, when the value of the frame_mbs_only_flag syntax element has a value of 1, the video is progressive video. Thus, changing frame_mbs_only_flag from 1 to 0, then setting the value of field_pic_flag to 0, defines essentially the same semantic for purposes of decoding, but adds a length of one bit to the slice header. Alternatively, the bitstream rewriting tool adds an extra dummy bit in some other way to offset the removal of adaptive_ref_pic_marking_mode_flag from the slice header.

The bitstream rewriting tool checks (490) if it is done receiving NAL units for the non-scalable bitstream. If not, the bitstream rewriting tool continues by receiving (410) the next NAL unit. In this way, the bitstream rewriting tool leverages the frame_mbs_only_flag syntax element in a new SPS, added field_pic_flag values, and an appropriate new PPSID value to avoid non-byte-aligned changes in length of slice headers when translating from a non-scalable bitstream with a flat prediction structure into a hierarchical prediction structure with two temporal layers. The resulting slice headers typically have the same length or are one byte longer (from the new PPSID value) for the temporal enhancement layer, and bit shifting is avoided in the translation process. Overall, with a new SPS, new PPS and (possibly) increased length in slice headers, the increase in bitrate is negligible.

C. Generalized Technique for Adding Temporal Scalability

Figure 7:
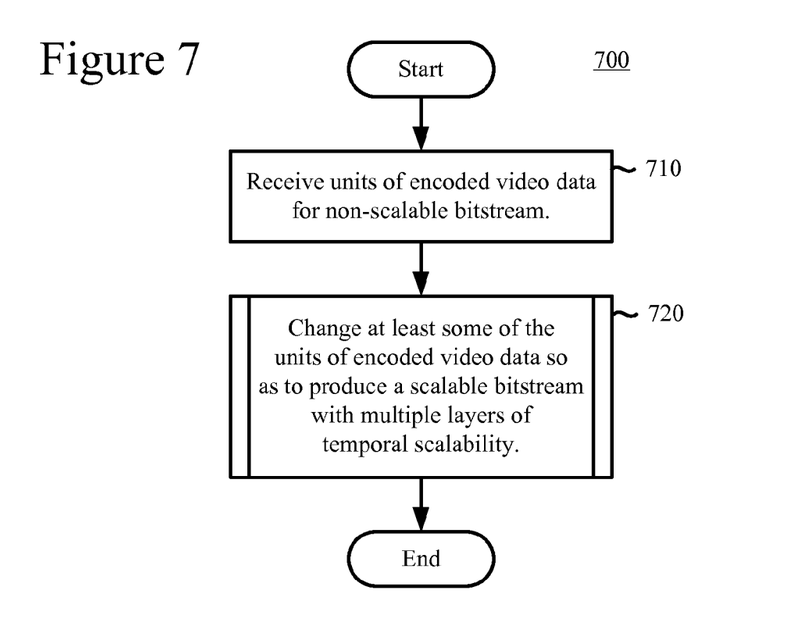
FIG. 7 is a flowchart illustrating a generalized technique for adding temporal scalability to a non-scalable bitstream.

FIG. 7 shows a generalized technique (700) for adding temporal scalability to a non-scalable bitstream. A bitstream rewriting tool such as the bitstream rewriter (220) in FIG. 2, or another type of bitstream rewriting tool, performs the technique (700).

To start, the bitstream rewriting tool receives (710) units of encoded video data for a non-scalable bitstream. For example, the bitstream rewriting tool receives the units of encoded video data from components of a hardware-based encoder adapted to produce non-scalable bitstreams. The units of encoded video data can be for an H.264/AVC bitstream, or they can follow another standard or proprietary format.

The bitstream rewriting tool changes (720) at least some of the units of encoded video data so as to produce a scalable bitstream with multiple layers of temporal scalability. The multiple layers of temporal scalability include a temporal base layer and at least one temporal enhancement layer. For example, to change the units of encoded data, the bitstream rewriting tool can associate a first group of parameter sets with a first set of pictures for the temporal base layer, and associate a second group of parameter sets with a second set of pictures for the temporal enhancement layer. Variations of this feature are explained below with reference to FIG. 8. Or, the bitstream rewriting tool can alter one or more syntax elements in the units of encoded video data. Variations of this feature are explained below with reference to FIGS. 9 and 10. Or, the bitstream rewriting tool can use the features shown in FIGS. 8-10 in combination. Alternatively, the bitstream rewriting tool changes at least some of the units of encoded video data in some other way, so as to produce a scalable bitstream with temporal scalability.

Figure 8:
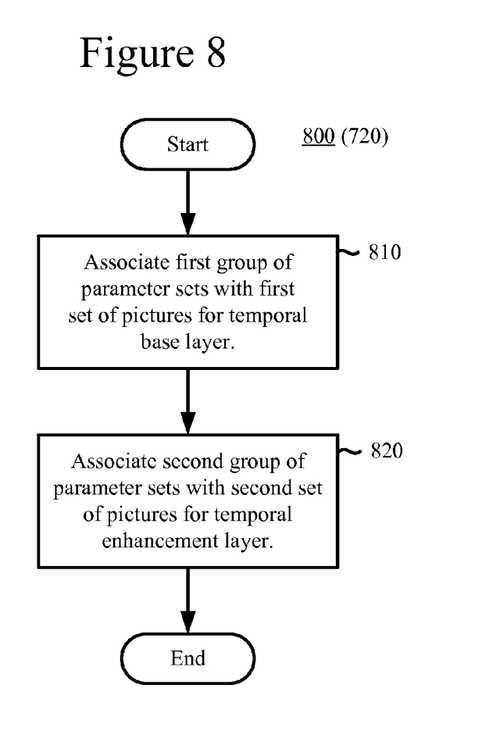
FIGS. 8-10 are flowcharts illustrating example features of the generalized technique.

FIG. 8 shows one technique (800) for changing at least some of the units of encoded video data when producing a scalable bitstream with temporal scalability. A bitstream rewriting tool such as the bitstream rewriter (220) in FIG. 2, or another type of bitstream rewriting tool, performs the technique (800).

The bitstream rewriting tool associates (810) a first group of parameter sets with a first set of pictures for the temporal base layer. For example, the first group of parameter sets includes an original SPS for the non-scalable bitstream and an original PPS for the non-scalable bitstream. The first set of pictures can be used as reference pictures for motion compensation of the second set of pictures, which are not used as reference pictures.

The bitstream rewriting tool associates (820) a second group of parameter sets with a second set of pictures for a temporal enhancement layer. For example, the second group of parameter sets includes a new SPS and a new PPS that references the new SPS. The new PPS can be based on the original PPS, in that the new PPS mostly has the same values of syntax elements as the original PPS. The new PPS has a new value of PPSID syntax element, however. For example, the new value of PPSID is set as described above with reference to FIG. 5.

The bitstream rewriting tool can then adjust the value of the PPSID syntax element in slice headers for coded slices associated with the temporal enhancement layer to have the new value of PPSID, such that the slice headers reference the new PPS, which in turn references the new SPS. The slice headers for coded slices associated with the temporal base layer keep the original value of PPSID, such that the slice headers reference the original PPS, which in turn references the original SPS. Thus, the bitstream rewriting tool can associate reference pictures for the temporal base layer and non-reference pictures for the temporal enhancement layer with two different sets of SPS and PPS.

Figure 9:
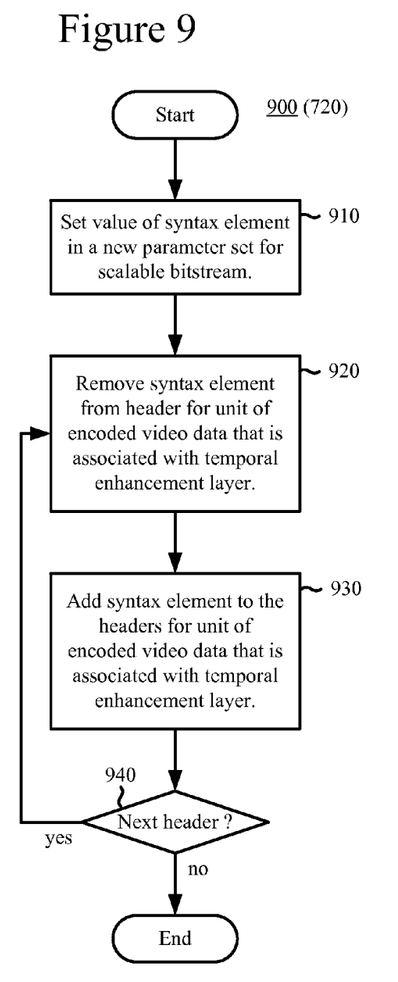

FIG. 9 shows another technique (900) for changing at least some of the units of encoded video data when producing a scalable bitstream with temporal scalability. A bitstream rewriting tool such as the bitstream rewriter (220) in FIG. 2, or another type of bitstream rewriting tool, performs the technique (900).

According to the technique (900) shown in FIG. 9, the bitstream rewriting tool alters one or more syntax elements in the units of encoded video data. The bitstream rewriting tool sets (910) a value of a first syntax element for the scalable bitstream. For example, the tool sets the value of a syntax element in a new parameter set for the scalable bitstream. The syntax element can be a frame_mbs_only_flag syntax element of a new SPS, or it can be some other type of syntax element.

The bitstream rewriting tool removes (920) a second syntax element from one of the units of encoded video data that is associated with the temporal enhancement layer. For example, the tool removes a syntax element from a header for a unit of encoded video data that is associated with the temporal enhancement layer. The removed syntax element can be an adaptive_ref_pic_marking_mode_flag syntax element in a slice header for a coded slice that is associated with the temporal enhancement layer, or it can be some other type of syntax element.

The bitstream rewriting tool also adds (930) a third syntax element to the unit from which the second syntax element was removed. For example, the tool adds a syntax element to the header for a unit of encoded video data that is associated with the temporal enhancement layer. The added syntax element can be a field_pic_flag syntax element in a slice header for a coded slice that is associated with the temporal enhancement layer, or it can be some other type of syntax element.

The bitstream rewriting tool checks (940) whether to continue with a next header for a unit of encoded video data that is associated with the temporal enhancement layer. If so, the tool removes (920) and adds (930 syntax elements, as appropriate.

Overall, the presence of the added syntax element in a header is contingent on the value set for the first syntax element (e.g., the value set for frame_mbs_only_flag in a new SPS). The added syntax element offsets the removed syntax element in the header, such that a unit of encoded video data with the removed/added syntax elements has the same length as before the removal/addition of syntax elements. Thus, for a scalable bitstream created from an H.264/AVC bitstream, the bitstream rewriting tool can leverage the frame_mbs_only_flag of a new SPS to compensate for 1-bit length difference in slice headers of coded slices for the temporal enhancement layer.

Figure 10:
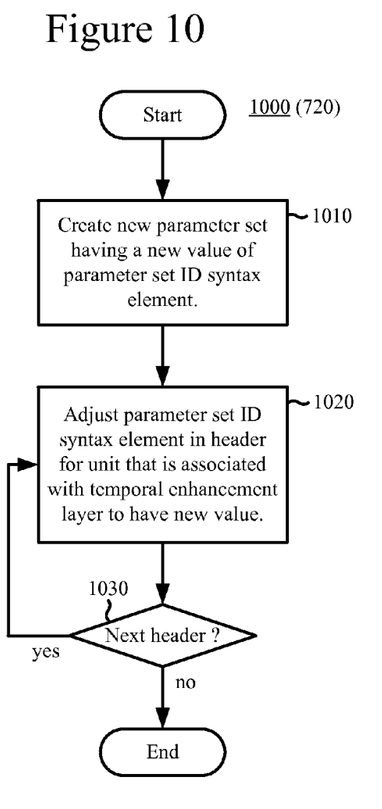

FIG. 10 shows another technique (1000) for changing at least some of the units of encoded video data when producing a scalable bitstream with temporal scalability. A bitstream rewriting tool such as the bitstream rewriter (220) in FIG. 2, or another type of bitstream rewriting tool, performs the technique (1000).

According to the technique (1000) shown in FIG. 10, the bitstream rewriting tool alters one or more syntax elements in the units of encoded video data. The bitstream rewriting tool creates (1010) a new parameter set having a new value of parameter set identifier syntax element. For example, the tool creates a new PPS based on an original PPS from the non-scalable bitstream, where the original PPS has an original value of PPSID with a first length, and the new PPS has a new value of PPSID with a second length that is the same as the first length or differs from the first length by a multiple of one byte. The new value of PPSID can be set as described above with reference to FIG. 5.

The bitstream rewriting tool then adjusts (1020) the value of the parameter set identifier syntax element in a header for a unit that is associated with the temporal enhancement layer to have the new value. For example, the tool adjust a PPSID value in a slice header for a coded slice associated with the temporal enhancement layer to have the new value of the PPSID.

The bitstream rewriting tool checks (1030) whether to continue with a next header for a unit of encoded video data that is associated with the temporal enhancement layer. If so, the tool adjusts (1020) the value of the parameter set identifier syntax element in that header, as appropriate. In this way, for a scalable bitstream created from an H.264/AVC bitstream, the bitstream rewriting tool can use appropriate values of PPSID to maintain byte alignment in slice headers of coded slices for the temporal enhancement layer.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing device that implements a bitstream rewriter, a method comprising:
  receiving units of encoded video data for a non-scalable bitstream; and
  changing at least some of the units of encoded video data so as to produce a scalable bitstream with multiple layers of temporal scalability, wherein the changing includes:
    associating a first group of parameter sets with a first set of pictures for a temporal base layer of the multiple layers of temporal scalability, wherein the first group of parameter sets includes an original sequence parameter set (SPS) for the non-scalable bitstream and an original picture parameter set (PPS) for the non-scalable bitstream; and
    associating a second group of parameter sets with a second set of pictures for a temporal enhancement layer of the multiple layers of temporal scalability, wherein the first set of pictures includes pictures to be decoded and used as reference pictures for motion compensation for at least some of the second set of pictures.

2. The method of claim 1 wherein the units of encoded video data are received from components of a hardware-based encoder adapted to produce non-scalable bitstreams, and wherein the bitstream rewriter is implemented as a firmware process for the hardware-based encoder.

3. The method of claim 1 wherein the second group of parameter sets includes a new SPS and a new PPS that references the new SPS.

4. The method of claim 3 wherein the new PPS is based on the original PPS but has a new value of PPS identifier (PPSID) syntax element, the new value of PPSID syntax element being set to have a length that is the same as or differs by a multiple of one byte from a length of an original value of PPSID syntax element for the original PPS.

5. The method of claim 4 wherein the changing further comprises adjusting values of PPSID syntax elements in slice headers for coded slices associated with the temporal enhancement layer to have the new value of PPSID syntax element.

6. The method of claim 1 wherein the changing comprises altering one or more syntax elements in the units of encoded video data.

7. The method of claim 6 wherein the altering includes:
setting a value of gaps_in_frame_num_value_allowed_flag syntax element to 1 in the original SPS and a new SPS; and
setting values of nal_ref_idc syntax elements to 0 in unit headers of those of the units of encoded video data that are associated with the temporal enhancement layer.

8. The method of claim 6 wherein the altering includes:
setting a value of frame_mbs_only_flag syntax element to 0 in a new SPS;
removing adaptive_ref_pic_marking_mode_flag syntax elements from slice headers for coded slices that are associated with the temporal enhancement layer; and
adding field_pic_flag syntax elements to the slice headers for coded slices that are associated with the temporal enhancement layer.

9. The method of claim 6 wherein the altering includes:
creating a new PPS based on the original PPS for the non-scalable bitstream, including setting a new value of PPS identifier (PPSID) syntax element for the new PPS such that the new value has a length that is the same as length of an original value of PPSID syntax element for the original PPS or differs from the length of the original value by a multiple of one byte; and
adjusting values of PPSID syntax elements in slice headers for coded slices that are associated with the temporal enhancement layer to have the new value.

10. A tangible computer-readable medium having recorded thereon computer-executable instructions for causing a computing device programmed thereby to perform a method, wherein the computer-readable medium is selected from the group consisting of volatile memory, non-volatile memory, magnetic disk storage, CD-ROM and DVD, the method comprising:
receiving units of encoded video data for a non-scalable bitstream; and
changing at least some of the units of encoded video data so as to produce a scalable bitstream with multiple layers of temporal scalability that include a temporal base layer and a temporal enhancement layer, wherein the changing comprises altering one or more syntax elements in the units of encoded video data, including:
setting a value of a first syntax element for the scalable bitstream;
removing a second syntax element from one of the units of encoded video data that is associated with the temporal enhancement layer; and
adding a third syntax element to the unit from which the second syntax element was removed, wherein the presence of the third syntax element is contingent on the value set for the first syntax element and offsets the removal of the second syntax element such that length of the unit is unchanged by the removing and the adding, thereby avoiding bit shifting operations due to the removing and the adding.

11. The computer-readable medium of claim 10 wherein the units of encoded video data are received from components of a hardware-based encoder adapted to produce non-scalable bitstreams, wherein the computer-executable instructions are implemented as a firmware process for the hardware-based encoder.

12. The computer-readable medium of claim 10 wherein:
the first syntax element is a value of a syntax element in a new parameter set;
the second syntax element is a syntax element from a header; and
the third syntax element is added to the header.

13. The computer-readable medium of claim 12 wherein the new parameter set is a new sequence parameter set, and wherein the header is a slice header for a coded slice that is associated with the temporal enhancement layer.

14. The computer-readable medium of claim 12 wherein the syntax element in the new parameter set is a frame_mbs_only_flag syntax element, wherein the removed syntax element is an adaptive_ref_pic_marking_mode_flag syntax element, and wherein the added syntax element is a field_pic_flag syntax element.

15. The computer-readable medium of claim 10 wherein the changing further comprises creating a new picture parameter set (PPS) based on an original PPS for the non-scalable bitstream, the original PPS having an original value of PPS identifier syntax element with a first length, and the new PPS having a new value of PPS identifier syntax element with a second length that is the same as the first length or differs from the first length by a multiple of one byte.

16. The computer-readable medium of claim 10 wherein the altering further comprises adjusting values of PPS identifier syntax elements in slice headers for coded slices associated with the temporal enhancement layer to have a new value of PPS identifier syntax element.

17. An encoder comprising:
memory for receiving units of encoded video data for a non-scalable bitstream from components of a hardware-based encoder; and
a bitstream rewriter implemented as a firmware process of the hardware-based encoder, the bitstream rewriter being adapted to change at least some of the units of encoded video data so as to produce a scalable bitstream with a temporal base layer and a temporal enhancement layer, wherein the bitstream rewriter includes:
instructions for associating an original sequence parameter set (SPS) and an original picture parameter set (PPS) with pictures for the temporal base layer;
instructions for associating a new SPS and a new PPS with pictures for the temporal enhancement layer;
instructions for setting a value of a syntax element in the new SPS;
instructions for removing a syntax element from a slice header for a coded slice that is associated with the temporal enhancement layer; and
instructions for adding a syntax element to the slice header for the coded slice that is associated with the temporal enhancement layer, wherein the presence of the added syntax element is contingent on the value set for the syntax element in the new SPS, and wherein the added syntax element offsets the removed syntax element in the slice header such that length of the slice header is unchanged by the removing and the adding, thereby avoiding bit shifting operations due to the removing and the adding.

18. The encoder of claim 17 wherein the bitstream rewriter further includes:
instructions for creating the new PPS based on the original PPS, the original PPS having an original value of PPS identifier (PPSID) syntax element with a first length, and the new PPS having a new value of PPSID syntax element with a second length that is the same as the first length or differs from the first length by a multiple of one byte; and
instructions for adjusting values of PPSID syntax elements in slice headers for coded slices that are associated with the temporal enhancement layer to have the new value of the PPSID syntax element.

19. The encoder of claim 17 wherein the bitstream rewriter further includes:
  instructions for setting a value of gaps_in_frame_num_value_allowed_flag syntax element to 1 in the original SPS and the new SPS; and
  instructions for setting values of nal_ref_idc syntax elements to 0 in unit headers of those of the units of encoded video data that are associated with the temporal enhancement layer.

20. The encoder of claim 17 wherein the syntax element in the new SPS is a frame_mbs_only_flag syntax element, wherein the removed syntax element is an adaptive_ref_pic_marking_mode_flag syntax element, and wherein the added syntax element is a field_pic_flag syntax element.

21. An encoder comprising:
  memory for receiving units of encoded video data for a non-scalable bitstream; and
  a bitstream rewriter adapted to change at least some of the units of encoded video data so as to produce a scalable bitstream with multiple layers of temporal scalability, wherein the bitstream rewriter includes:
    instructions for associating a first group of parameter sets with a first set of pictures for a temporal base layer of the multiple layers of temporal scalability, wherein the first group of parameter sets includes an original sequence parameter set (SPS) for the non-scalable bitstream and an original picture parameter set (PPS) for the non-scalable bitstream; and
    instructions for associating a second group of parameter sets with a second set of pictures for a temporal enhancement layer of the multiple layers of temporal scalability, wherein the first set of pictures includes pictures to be decoded and used as reference pictures for motion compensation for at least some of the second set of pictures.

22. The encoder of claim 21 wherein the encoder is a hardware-based encoder adapted to produce non-scalable bitstreams, wherein the units of encoded video data are received from components of the hardware-based encoder, and wherein the bitstream rewriter is implemented as a firmware process for the hardware-based encoder.

23. The encoder of claim 21 wherein the second group of parameter sets includes a new SPS and a new PPS that references the new SPS.

24. The encoder of claim 23 wherein the new PPS is based on the original PPS but has a new value of PPS identifier (PPSID) syntax element, the new value of PPSID syntax element being set to have a length that is the same as or differs by a multiple of one byte from a length of an original value of PPSID syntax element for the original PPS.

25. The encoder of claim 24 wherein the changing further comprises adjusting values of PPSID syntax elements in slice headers for coded slices associated with the temporal enhancement layer to have the new value of PPSID syntax element.

* * * * *